July 23, 1968     C. G. PHIPPS     3,394,260

RADIATION-PROTECTIVE GARMENT WITH FORCED AIR VENTILATION

Filed Oct. 22, 1965

INVENTOR.
CLIFFORD G. PHIPPS
BY
AGENT
ATTORNEY

United States Patent Office 3,394,260
Patented July 23, 1968

3,394,260
RADIATION-PROTECTIVE GARMENT WITH
FORCED AIR VENTILATION
Clifford G. Phipps, Newbury Park, Calif., assignor to the
United States of America as represented by the Secretary of the Navy
Filed Oct. 22, 1965, Ser. No. 502,735
2 Claims. (Cl. 250—108)

ABSTRACT OF THE DISCLOSURE

A radiation-protective garment to be worn by an individual undergoing bio-medical testing, during which time the reception by such individual of either ambient electrostatic and/or electromagnetic energy may produce physiological effects capable of introducing inaccuracies into the test data obtained. The garment is a laminated assembly of at least two electrically-conductive layers insulated from one another, one layer being grounded and the other being of comminuted metal effective as a shield below audio frequency. Pressurized air is introduced into the garment to maintain even body temperature and reduce excessive perspiration.

---

The invention described herein may be manufactured and used by or for the Government of the United States of America for governmental purposes without the payment of any royalties thereon or therefor.

The present invention relates to a protective garment, or covering, to be worn by an individual undergoing bio-medical examination in an environment where spurious radiation may be present, such radiation, when received by the individual, resulting in the introduction of erroneous or misleading information into the test data obtained.

At the present time, numerous projects are being undertaken in which the individuals concerned are subjected to severe physical and mental stresses. In order to ascertain in advance not only the physical make-up of these individuals but also their probable reaction to certain anticipated situations, exhaustive testing of each such person is highly desirable. Among the examinations normally prescribed is the obtaining of an electro-cardiogram, usually of the broad-band type, this procedure being carried out in the usual way by means of electrodes attached to certain portions of the individual's body. The output waveform, recorded in conventional fashion upon a suitable medium, yields important information as to the heart action of the individual being tested. In many cases, however, this examination is performed in environments where spurious electrostatic and/or electromagnetic radiation is present, this radiation emanating from various types of electrical apparatus such as motors, X-ray machines, etc. which may be somewhat remote from the place at which the individual is being tested but nevertheless may be close enough so that their influence extends to the location at which the electrocardiogram is being made.

It is known that the human body is affected by the presence of an electromagnetic field, The latter acts to set up a potential gradient between different portions of the body, so that very minute currents are caused to flow. Obviously the presence of these currents during an examination of the type above referred causes spurious indications to be induced into the data obtained and hence can readily result in the development of misleading test results.

Some evidence is also present that internal stresses are established within the human body when the latter receives electromagnetic radiation. If the radiation is of sufficient magnitude, a rise in temperature sufficiently high to be measured may occur. Under certain conditions, this may affect the action of the heart sufficiently to render the test data unusable for practical purposes. In any event, available evidence clearly points to the fact that voltages and currents are definitely induced in instrumented subjects when the latter receive uncontrolled and unwanted ambient radiation. Summing up, therefore, all of the biological effects that have been observed to the present time indicate that the human body requires protection from spurious electromagnetic radiation at a time when bio-medical examinations are being carried out in order that the data obtained from such examination reflect the true reaction of the individual to the particular test being undertaken.

The above factors have previously been recognized, and certain steps have been taken from a protective standpoint. For example, it has been customary to construct a so-called "screen room" so that the walls of the room constitute an electrostatic and/or electromagnetic shield. However, this expedient possess a number of disadvantages, among which are its expensive construction and the fact that such enclosures frequently introduce psychosomatic responses from subjects being tested. Furthermore, such rooms are obviously not portable when the acquisition of data in the field is desired. Still further, for testing of a dynamic nature, such rooms offer only limited utility because of their size restrictions.

In accordance with a feature of the present concept, a garment, or covering, is provided which is intended to substantially completely enclose the body of the wearer during such time that bio-medical testing of the individual is being carried out. The garment material is of such a nature as to form an effective electro-magnetic and/or electrostatic shield to preclude the impingement of spurious radiation upon the skin of the individual being tested and hence eliminate the possibility that misleading indications will be introduced into the output data. It should be emphasized that the garment herein described is in no sense intended to replace, or be a substitute for, previously-known coverings of the type worn, for example, by operators of X-ray machines or those engaged in nuclear activities, where the radiation expected to be encountered is of a high order of magnitude. The thick shielding material employed under such circumstances (usually a sheet of lead) is obviously unsuitable for bio-medical activities, inasmuch as the garment required to obtain the objectives of the present disclosure must be relatively thin, light in weight, and of a highly flexible nature. Furthermore, it should be portable and capable of being folded up into a small package size. A very important aspect of the present disclosure, however, is that the garment described herein is specifically designed to eliminate (or materially reduce) the psychosomatic responses which an individual under test would yield if he were to be covered by a thick, heavy, cumbersome shielding member of the type previously developed for high-energy protection. Still further, the shield garment of the present invention eliminates restrictions on dynamic testing by permitting the subject to move about freely over as large an area as may be required for the particular test being conducted. This is not possible with so-called "screen rooms" of the nature set forth above. As a final advantage, the garment of the present disclosure is readily fabricated from low-cost material, and can be turned out in large numbers by conventional manufacturing techniques.

One object of the present invention, therefore, is to provide a garment or covering designed to protect the wearer from the effects of ambient electrostatic and/or electromagnetic radiation during a time period when the wearer is being subjected to bio-medical examination.

A further object of the present invention is to provide a radiation-protective garment which not only yields maximum protection from ambient electromagnetic energy, but, in addition, is readily fabricated of flexible, lightweight material.

An additional object of the invention is to provide a multi-layer protective garment intended to shield the wearer from the effects of ambient electromagnetic radiation, such garment being made up of a thin sheet of electrically-conductive material sandwiched between two layers of plastic, the assembly then being reinforced by a grid of cotton cloth, all of the layers being compressed together in laminated fashion.

A still further object of the invention is to provide a garment designed to shield the wearer from the effects of spurious electromagnetic radiation, such garment comprising a first continuous sheet of electrically-conductive material designed to protect the wearer from the effects of most types of electrostatic and electromagnetic radiation, together with a further layer of material designed to be essentially impervious to incident electromagnetic energy lying within a particular frequency band to which the first-mentioned material offers no protection.

Other objects, advantages, and novel features of the invention will become apparent from the following detailed description of the invention when considered in conjunction with the accompanying drawings wherein.

Figure 1:
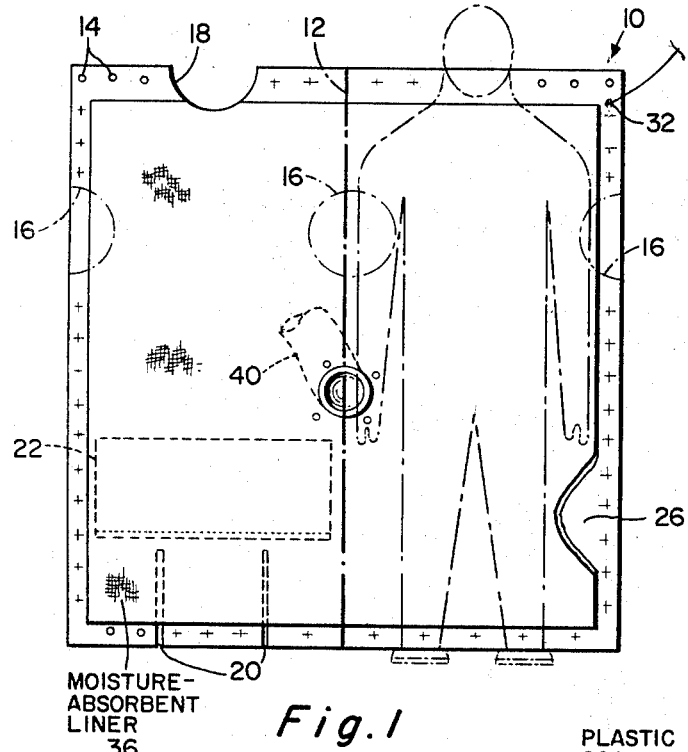
FIG. 1 is a plan view of one surface of a pad of material designed in accordance with a preferred embodiment of the present invention, and intended to be folded into a garment or covering for an individual undergoing bio-medical examination.
Figure 5:
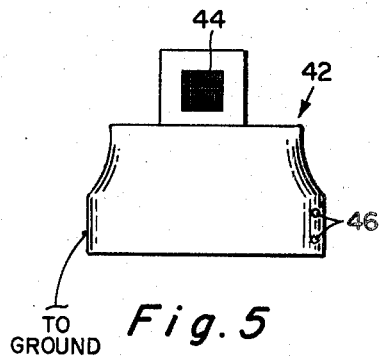
Figure 2:
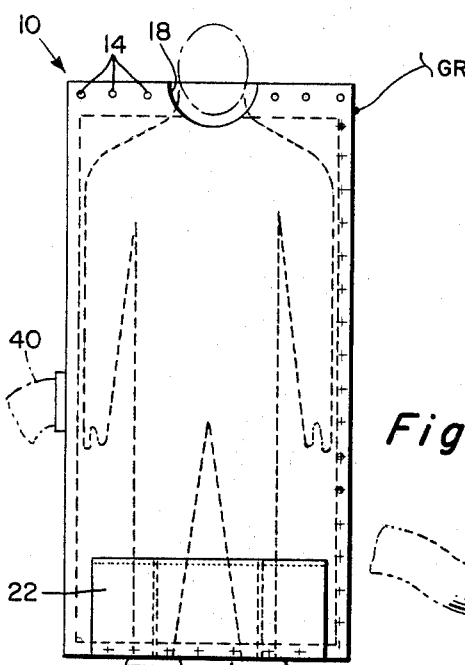
FIG. 2 is a plan view of the pad of FIG. 1 after it has been folded to substantially completely enclose the body of an individual undergoing such examination.
Figure 3:
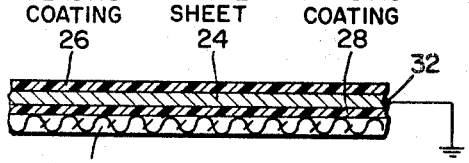
FIG. 3 is an enlarged cross-sectional view of a portion of the material of which the pad of FIGS. 1 and 2 is constituted.
Figure 4:
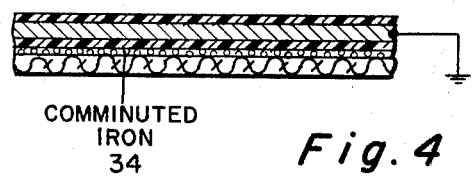

FIG. 4 is an enlarged cross-sectional view of an alternative form of material suitable for use in place of that set forth in FIG. 3; and FIG. 5 is an elevational view of a head covering, utilizing the material of FIGS. 1 through 4 and designed to be worn by an individual under circumstances wherein it is only desirable or necessary to shield the upper part of the individual's body from the effects of ambient electromagnetic and/or electrostatic fields.

As above set forth, the principal objective of the present invention is to provide a garment to protect an individual, while undergoing bio-medical examinaton, from the effects of ambient electromagnetic and/or electrostatic fields which would otherwise introduce misleading data into the examination results. In order to achieve this objective, the present concept contemplates surrounding the body of the individual with a covering which is impervious to such radiation. In a preferred embodiment, this covering is formed from a pad or blanket 10 of flexible material which, when laid out on a flat surface, is somewhat rectangular in shape as best shown in FIG. 1 of the drawings. Before describing the nature of the material of which the pad or blanket 10 is composed, it might be desirable to point out that, in order to facilitate the testing operation, the individual who is to be subjected to the test need only lie upon such pad or blanket so that his body covers approximately one-half the area thereof, a preferred position being indicated by the dotted outline in FIG. 1. While the individual is thus lying supine, the remaining half of the pad is folded over the subject along the broken line 12. As a result, the subject to be tested is substantially completely enclosed by the material of the pad or blanket except for that portion of his body above the neck and his pedal extremities. However, it has been found in practice that exposure of these portions of the body is unimportant insofar as the test results obtained are concerned. When the pad or blanket 10 has been so folded, the corresponding edges thereof may be secured together by some means such as a plurality of snap fasteners 14. The covering then appears as shown in FIG. 2 of the drawings.

Although it is usually desirable that the subject's arms be within the protective enclosure, under certain circumstances, especially when the examination being conducted requires the subject to move from one location to another by walking between such points, the arms of the individual may be better positioned temporarily outside the confines of the garment. For that reason, it is within the scope of the present disclosure to provide openings through which the subject's arms may extend. Such optional openings are indicated in the drawing by dotted lines and identified by the reference numeral 16. These openings correspond generally to the opening 18, which is provided so that the subject's head may protrude from the garment, while, at the same time, the edges of the latter fit snugly around the neck of the individual being tested. Further, in order to provide for protrusion of the subject's pedal extremities, a pair of slits 20 are formed along the lower edge of the upper portion of the pad or blanket 10 (see FIG. 2) and a flap 22 is sewn or otherwise affixed to the outer surface of the garment to overlie these slits 20. In FIG. 1 the flap 22 appears in raised position and on the rear surface of the pad as viewed in the drawing, or, in other words, on that surface thereof which is in contact with the support upon which the pad 10 has been placed. Summarizing, therefore, the individual being tested, when enclosed by the garment of the present disclosure, appears as shown in FIG. 2 when he is in condition for a bio-medical examination. Such construction also enables the wearer to be in standing position if the particular test being conducted so requires.

FIG. 3 of the drawings shows a preferred form of construction for the pad or blanket 10 of FIGS. 1 and 2. The pad material is illustrated in cross-section, and consists of a thin layer or sheet 24 of flexible electrically-conductive material (such, for example, as aluminum) having a plastic coating 26 on one surface thereof and a further plastic coating 28 covering the other surface. Although many types of plastic substances are suitable for the present purpose, it might be mentioned that the main requirements are that the plastic be of an electrically non-conductive nature and be capable of being folded or creased without appreciable cracking or splitting. In order to provide structural rigidity to the assembly, a sheet 30 of fabric such as cloth is affixed to the plastic layer 28 by some suitable adhesive (not shown) and then the entire assembly is pressed or bonded together to form a pad which is extremely thin, light in weight, and capable of being folded into a small package size for ready transportation.

The aluminum or other electrically-conductive sheet 24 is connected to ground at one or more points 32 to provide an electrostatic shield for radiation at all frequencies and further to function as an electromagnetic shield for frequencies in the audio range and above.

If it is desired to shield the subject under examination from ambient electromagnetic energy below the audio frequency range the garment material may be modified as shown in FIG. 4 of the drawings. In this embodiment, one or more layers of finely powdered or comminuted conductive material (iron, for example) may be added, as indicated by the reference numeral 34 in the drawing. Although these iron particles in a suitable liquid vehicle may be sprayed if desired onto the outer surface of the pad material, it is preferable for ease of handling to incorporate such iron particles within the body of the pad or blanket, such, for example, as between the plastic layer 28 and the cloth 30. It is only necessary that the iron particles be kept from direct contact with the aluminum sheet, as otherwise they would be ineffective for the purpose intended. It has been found in practice that these iron particles, when so employed, substantially completely cut off all but a negligible percentage of incident electromagnetic energy over a wide portion of the frequency spectrum.

It is important to note that the garment hereinabove described has the important characteristic of not producing any detectable psychosomatic response in the subject under examination. This is undoubtedly due to the fact that the garment has both the appearance of and wearing characteristics of normal clothing, and is of such light weight as to place no burden upon the wearer. Furthermore, the subject is free to walk from one location to another while wearing the garment without having his progress impeded by tight-fitting or otherwise restrictive coverings.

It has been found that, under certain conditions, especially when the tests which the subject is undergoing require a considerable period of time, that the wearing of the garment herein described causes the wearer to perspire rather freely, and, furthermore, that his body temperature rises somewhat due to the lack of air circulation within the garment itself. With respect to excessive perspiration, which can result in electrical variations reaching the output electrodes from portions of the wearer's body other than those to which the electrodes are attached, means are provided whereby its effects can be overcome by utilizing a sheet of highly absorbent material (such, for example, as terry cloth) interposed between the body of the subject and the inner surface of the pad or blanket 10. This sheet of terry cloth, the use of which is optional, has been shown in FIG. 1 of the drawing and identified by the reference numeral 36. It is cut so as to be substantially co-extensive with the boundaries of the pad or blanket 10, and may or may not be attached to the latter along the edges thereof depending largely on whether its use is to be for extensive periods of time or only for isolated tests. In any event, it has been found that the presence of such a highly absorbent liner adds considerably to the comfort of the individual being tested.

To further add to the well-being of an individual being examined over relatively long periods of time, it has been found desirable in some circumstances to introduce a circulation of fresh air within the garment 10. This is accomplished by employing a blower 38, preferably of the electrically-operated type, designed to furnish fresh air under pressure to the interior of the garment 10 through a tube or conduit 40, as best shown in FIG. 2. There are sufficient gaps in the mating edges of the pad 10 between the fasteners 14 so that air entering through the tube 40 may leak out, and this continuous flow of fresh air within the garment greatly enhances the comfort of the wearer during conduct of the examination.

Although the material of the pad 10, as best shown in FIGURES 3 and 4, is intended primarily for use in a garment of the type set forth in FIGS. 1 and 2, it has also been found to be suitable in circumstances where only the wearer's head (and possibly the extreme upper portion of his torso) need be protected during certain bio-medical tests. For such purpose, the material of FIGS. 3 and 4 may be formed into a hood or helmet of the nature illustrated in FIGURE 5 of the drawings and identified by the reference numeral 42. This hood or helmet 42, when slipped over the head of an individual to be tested, forms a protective radiation shield for that portion of the wearer's body covered thereby. If desired, a window 44 may be formed in the head portion of such member 42, this window being preferably designed as a thin wire mesh which allows the subject to breathe freely and communicate both visually and orally. This wire mesh is electrically conductive and is connected to the aluminum sheet 24 (or in some other fashion grounded) so as to provide maximum protection against ambient electromagnetic and/or electrostatic fields. In order to facilitate quick removal of the hood 42 from the individual, a plurality of snap fasteners 46 may be located on one side of the hood, as illustrated.

Although the material of the present invention, as set forth in FIGS. 3 and 4 of the drawings, has been indicated as being particularly suitable for incorporation into a garment of the type set forth in FIGS. 1 and 2, it is apparent that it may be employed to cover any particular part of the body from which ambient radiation is desired to be excluded. For example, it may be fabricated into a vest to be worn by an aircraft pilot under his flight garments. This is particularly applicable to so-called dynamic testing, when no covering is permissible which would in any way interfere with the pilot's normal movements in operating his craft.

Various forms of the garment herein described are capable of wide application. For example, in addition to hospitals or dispensaries where clinical EKG's, ECG's and EEM's are run, all bio-medical laboratories can benefit from the assurance that the data obtained from examinations of this type has not been influenced by unknown and unwanted energies which could render the observed results highly misleading or undependable. The application to space medicine and physiology instrumentation is also clearly indicated.

Obviously many modifications and variations of the present invention are possible in the light of the above teachings. It is therefore to be understood that within the scope of the appended claims the invention may be practiced otherwise than as specifically described.

I claim:

1. A garment for wear by an individual while being subjected to bio-medical tests, wherein the reception by such individual during such tests of either ambient electrostatic or electromagnetic energy may produce physiological effects capable of introducing inaccuracies or misleading information into the test data obtained, such garment comprising:

a multi-layer pad designed to substantially completely enclose said individual therewithin, said pad being made up of:
   (a) a sheet of thin, flexible, light-weight electrically-conductive material;
   (b) two layers of electrically-insulating material covering the respective surfaces of said sheet, said layers of electrically-insulating material being composed of plastic capable of being folded and creased without causing appreciable cracking or splitting thereof;
   (c) a reinforcing layer of woven fabric adhesively secured to one of the said layers of insulating material and forming the outer surface of sad garment;
   (d) an additional layer of comminuted electrically-conductive material, out of electrical contact with said electrically conductive sheet, and serving as a shield to incident electromagnetic energy of below audio frequency;
   (e) the assembly of said electrically-conductive sheet, said two insulating layers, said layer of comminuted material, and said woven fabric layer being of unitary lamination design;

means electrically connecting said sheet of electrically-conductive material to ground while said garment is being worn by said individual to thereby protect the latter from the influence of ambient electrostatic and/ or electromagnetic fields;

a source of air under pressure; and means for conducting pressurized air from said source to the interior of said garment while the latter is being worn by an individual during bio-medical testing, thereby avoiding the introduction of inaccuracies into the obtained test data due to the retention within said garment of excessive body perspiration and/ or due to a rise in body temperature when the air within said garment is not in circulation.

2. A substantially rectangular multi-layer pad of laminated material designed to be placed upon a planar surface and to be subsequently folded over the body of an individual lying supine on one side of the center line thereof, such pad, when so folded, substantially completely enclosing the body of said individual therewithin;

said pad having fastening means along the mating edges thereof produced by such folding so as to form a substantially gapless garment for said individual;

one of the layers of said pad being of a uniform electrically-conductive nature and impervious to both electrostatic and electromagnetic fields of low magnitude; a further layer of comminuted metal out of electrical contact with said first-mentioned electrically-conductive layer and serving as a protective shield solely to electromagnetic radiation lying within a given portion of the frequency spectrum;

and means for connecting said first-mentioned electrically-conductive layer to a point of ground potential, thereby shielding said individual from the effects of said fields.

References Cited

UNITED STATES PATENTS

| | | |
|---|---|---|
| 1,607,140 | 11/1926 | Wappler. |
| 2,877,286 | 3/1959 | Vance et al. |
| 2,977,591 | 3/1961 | Tanner. |
| 3,164,840 | 1/1965 | Reynolds. |
| 3,239,669 | 3/1966 | Weinberger. |

FOREIGN PATENTS

| | | |
|---|---|---|
| 576,742 | 5/1959 | Canada. |

RALPH G. NILSON, *Primary Examiner.*

S. ELBAUM, *Assistant Examiner.*